United States Patent [19]

Itoh

[11] 4,039,503

[45] Aug. 2, 1977

[54] SILICONE RUBBER COMPOSITIONS

[75] Inventor: Kunio Itoh, Annaka, Japan

[73] Assignee: Shin-Etsu Chemical Co., Ltd., Tokyo, Japan

[21] Appl. No.: 658,124

[22] Filed: Feb. 13, 1976

[30] Foreign Application Priority Data

Feb. 19, 1975   Japan .................................. 50-20473

[51] Int. Cl.$^2$ ............................................. C08L 83/04
[52] U.S. Cl. ........................... 260/37 SB; 260/46.5 G; 260/824 R; 260/825
[58] Field of Search .............. 260/46.5 G, 824 R, 825, 260/37 SB

[56]   References Cited

U.S. PATENT DOCUMENTS

| 3,660,345 | 5/1972 | Bobear | 260/825 |
| 3,723,567 | 3/1973 | Mink et al. | 260/825 |

*Primary Examiner*—Melvyn I. Marquis
*Attorney, Agent, or Firm*—Toren, McGeady and Stanger

[57]   ABSTRACT

Silicone rubber compositions comprising a diorganopolysiloxane gum, an inorganic filler, a vinyl-containing organopolysiloxane resin, polyester fibers cut in a specific length, an amino- or mercapto-containing organosilane or organopolysiloxane as a coupling agent, and an organic peroxide as a curing agent. The novel compositions are capable of giving excellent mechanical properties, especially tear strength, to cured products or silicone elastomers, their other properties being as good as the conventional silicone rubber elastomers.

12 Claims, No Drawings

SILICONE RUBBER COMPOSITIONS

BACKGROUND OF THE INVENTION

1. Field of the Invention

This invention relates to silicone rubber compositions convertible to elastomers having highly improved mechanical strengths, especially tear strength.

2. Description of the Prior Art

Silicone rubber elastomers are generally recognized for their outstanding heat-resistance and electric characteristics, but are considered disadvantageous with respect to their inferior mechanical strengths, especially tear strength, as compared to other synthetic or natural rubbers. This results in restriction in the applications of these materials.

Various methods have been proposed for imparting greater mechanical strengths to silicone rubbers. The proposed methods include (i) a method comprising curing a blend of diorganopolysiloxane gums with minor and major amounts of vinyl groups attached to silicone atoms in the presence of an organic peroxide, so that the resulting cured elastomers may have a localized distribution of crosslinking points (see U.S. Pat. No. 3,660,345); (ii) a method comprising incorporating in the rubber stocks, a reinforcing silica filler treated with a silane or siloxane having, particularly, alkoxy or silanol groups, so that the physical properties of the resulting elastomers can be improved (see U.S. Pat. Nos. 3,024,126 and 3,122,520); (iii) a method comprising incorporating fibrous asbestos so that the reinforcing effect may be enhanced without impairing the heat resistance of the resulting elastomers (see Japanese Public Disclosure No. 48-80656); and (iv) a method comprising formulation with the block copolymers of organopolysiloxane, so that the resulting elastomers may have a localized distribution of crosslinking points (see U.S. Pat. Nos. 3,665,052, 3,668,273, 3,701,815, 3,781,378 and 3,819,744).

The above methods can, indeed, impart high tear strength to the silicone rubbers, but are defective in that they tend to lower the modulus of the rubbers due to decreases in the crosslinking density and also the occurrence of relatively long segments between the crosslinking points. For example, the silicone rubbers obtained by the known methods have been found to give poor results in the cut-through test, penetration test and crushing test when employed as an insulating material for electric wire coverage.

OBJECTS OF THE INVENTION

It is therefore an object of this invention to provide a novel silicone rubber composition which is convertible to elastomers having remarkably improved mechanical strengths, especially tear strength, along with a high modulus.

It is another object of the invention to provide a novel silicone rubber composition which is convertible to elastomers having negligible decreases in their tensile strength even at high temperatures and, at the same time, which exhibit high compressive stress at various compressions.

SUMMARY OF THE INVENTION

In accordance with the present invention, I have unexpectedly discovered that silicone rubber compositions convertible to cured elastomers having highly improved mechanical strengths, especially tear strengths, up to 135 kg/cm² at 25° C, as well as improved heat-resistance and electric characteristics can be obtained by uniformly blending the following components in a suitable manner.

a. 100 parts by weight of a diorganopolysiloxane gum represented by the average unit formula $$R_a^1 SiO_{4-a/2} \quad (I)$$

where $R^1$ is a substituted or unsubstituted monovalent hydrocarbon group and has a value from 1.98 inclusive to 2.05 inclusive, b. from 20 to 250 parts by weight of an inorganic filler, c. from 1 to 20 parts by weight of an organopolysiloxane composed of from 20 to 60 mole % $C_6H_5 SiO_{1.5}$ units, from zero to 20 mole % $CH_2=CHSiO_{1.5}$ units, from 15 to 30 mole % $(CH_3)(CH_2=CH)SiO$ units and 20 to 50 mole % $(CH_3)_2SiO$ units, the total of the $C_6H_5SiO_{1.5}$ and $CH_2=CHSiO_{1.5}$ units being equivalent to from 20 to 60 mole % based on all of the siloxane units, d. from 10 to 100 parts by weight of polyester fiber having a softening point of 200° C or higher and composed of filaments from 0.5 to 5 mm in length, e. from 0.5 to 10 parts by weight of an organic silicon compound represented by the formula

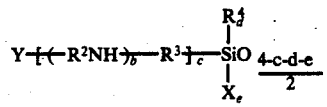

(II)

where $R^2$ and $R^3$ each are the same or different divalent hydrocarbon groups, $R^4$ is a substituted or unsubstituted monovalent hydrocarbon group, X is a hydroxy or hydrolyzable group, Y is a group selected from the class consisting of $H_2N-$, $NC-$, $HO.CO.CH_2.NH-$, $NH_2.CO.NH-$,

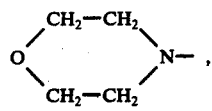

$C_6H_5-NH-$ and $HS-$, $b$ has a value of 0 or 1, $c$ has a value greater than 0 but not exceeding 1, and $d$ and $e$ each have a value from 0 inclusive to 3 inclusive, with the proviso that $(c+d+e)$ is equal to a value greater than 0 but not exceeding 4, and f. from 0.1 to 10 parts by weight of an organic peroxide.

DESCRIPTION OF THE PREFERRED EMBODIMENTS

To describe the present invention in detail, specifically with regard to the above-mentioned components, the substituted or unsubstituted monovalent hydrocarbon groups denoted by $R^1$ in Formula I representing component (a) are exemplified by alkyl groups, such as, methyl, ethyl, propyl and butyl groups; alkenyl groups, such as, vinyl group; aryl groups, such as, phenyl and tolyl groups; cycloalkyl groups, such as, cyclohexyl and cyclopentyl groups; aralkyl groups, such as, the benzyl group; and halogenated hydrocarbon groups, such as, chloromethyl, trichloropropyl, trifluoropropyl and bromophenyl groups.

Component (a) may be one which is conventionally used in the preparation of silicone rubbers. Also, component (a) may have its molecular chain terminated by either hydroxy or triorganosilyl (for example, trimethylsilyl or vinyldimethylsilyl) groups, but this listing is in no way limitative thereof.

Preferably, the diorganopolysiloxane of component (a), contains a small amount of vinyl groups in the form of $(CH_2=CH)(CH_3)SiO$ or $(CH_2=CH)(CH_3)_2SiO_{0.5}$ units, for example, up to 0.5 mole % of all the siloxane units, when increased curing velocity and somewhat higher modulus of the cured elastomers are desired. It is also desirable that not more than 10 mole % of the phenyl groups are present in component (a) in order to bring about superior mechanical properties at low temperatures.

The inorganic fillers as component (b) which are useful in the composition of the invention are the known ones usually employed in the like compositions. Their examples include silica or silicates, such as, precipitated silica, diatomaceous earth, finely divided fume silica, quartz and glass, magnesium silicate and aluminum silicate; metal oxides, such as, titanium dioxide, aluminum oxide and zinc oxide; metal carbonates, such as, calcium carbonate and magnesium carbonate; and inorganic fibers, such as, glass fibers, asbestos and carbon fibers. A single filler or mixture of fillers can be employed.

The amount of the filler may range from 20 to 250 parts by weight per 100 parts by weight of component (a), depending on the uses of the finished composition or the kinds of component (a) employed. Any amounts of the filler less than the lower limit of the above-mentioned range will induce the silicone rubber elastomers prepared from the finished composition to lower their mechanical strengths, while, on the other hand, any amounts of the filler more than the upper limit of the same range will work to lower the moladability of the composition.

The organopolysiloxanes suitable for use as component (c), which are composed of the $C_6H_5SiO_{1.5}$, $CH_2CHSiO_{1.5}$, $(CH_3)(CH_2=CH)SiO$, and $(CH_3)_2SiO$ units each in the specific amount, provided the $CH_2=CHSiO_{1.5}$ units may be employed optionally, can be prepared by cohydrolysis and cocondensation of the corresponding 3 or 4 chlorosilanes. It is preferred, in accordance with the present invention, that the amount of residual hydroxy groups contained in the organopolysiloxane is not less than 0.5% by weight based on the weight of the organopolysiloxane as component (c).

Component (c) in the composition of this invention is, presumably, effective as a dispersing aid to the polyester fibers in the organopolysiloxane matrix or as an adhesive between the fibers and the siloxane matrix in conjunction with component (e).

The amount of component (c) to be added is from 1 to 20 parts by weight, preferably from 1 to 5 parts by weight, per 100 parts by weight of component (a). When component (c) is used in an amount less than 1 part by weight, its effect as noted above will be insufficient, while any amounts larger than 20 parts by weight will result in inferior mechanical properties in the resulting silicone rubber elastomers.

The polyester fiber as component (d) is typically a polyethyleneterephthalate synthetic fiber employed in various types of textiles. Its softening point and the length of each filament as specified are critical. That is to say, any softening points lower than 200° C. are not suitable for giving sufficient heat-resistance to the resulting silicone rubbers; filaments shorter than 0.5 mm are not suitable for producing sufficiently strong silicone rubbers, even though larger quantities are used, while those longer than 5 mm will impair the processability and moldability of the compositions on rolls to a great degree, since such longer filaments can not uniformly be dispersed in the composition.

Incidentally, the polyester fibers as component (d) are not critical with respect of their fineness; conventional fibers employable in textile fabrics are suitable with a fineness ranging, for example, from 1 to a few denier.

The amount of component (d) ranging from 10 to 100 parts by weight, preferably from 10 to 60 parts by weight, per 100 parts by weight of component (a) is also critical. If it is less than the lower limit, sufficiently strong silicone rubbers may not be produced, while if it is more than the upper limit, the resulting compositions will have inferior processability and moldability and, additionally, the finished silicone rubbers will lack flexibility and heat-resistance.

Next, the organic silicon compound used as component (e) in the composition of this invention is used in conjunction with component (c) which works as an adhesive between the polyester fibers and the organopolysiloxane matrix as described above in connection with the effect of component (c). The organic silicon compounds are represented by Formula II wherein $R^2$ and $R^3$ are exemplified by aliphatic divalent hydrocarbon groups, such as, $—CH_2—$, $-(CH_2)_2$, $-(CH_2)_3$, $-(CH_2)_4$ and $—CH=CH—CH_2$ groups and aromatic hydrocarbon groups, such as,

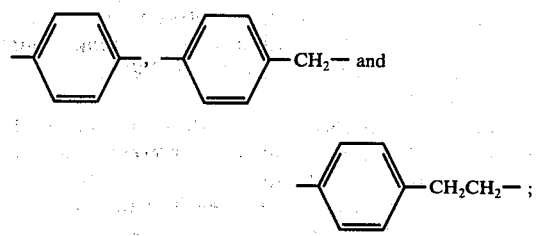

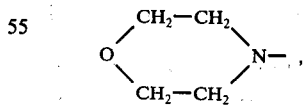

$R^4$ is the same as $R^1$ defined in reference to Formula I representing component (a); X is exemplified by a hydroxy group, halogen atoms, such as, chlorine and bromine atoms, alkoxy groups, such as, methoxy, ethoxy and propoxy groups, acyloxy groups, such as, acetoxy group, and other hydrolyzable groups, such as, amino, amide and aminoxy groups; Y is $NH_2—$, $NC—$, $HO.-CO.CH_2.NH—$, $NH_2.CO.NH—$, $$O\diagup\begin{matrix}CH_2-CH_2\\ \\CH_2-CH_2\end{matrix}\diagdown N-,$$

HS— or $C_6H_5—NH—$ group; and the values of b, c, d and e are as defined hereinabove.

Illustrative of the organic silicon compounds useful as component (e) in the compositions of this invention are silanes, and siloxanes prepared by partial hydrolysis and condensation of the silanes having the following formulas.

1. $NH_2-(CH_2)_3Si(-OC_2H_5)_3$
2. $NH_2—CH_2—CH_2—NH-(CH_2)_3Si(—OCH_3)_3$

3. HO.CO.CH$_2$—NH—(CH$_2$)$_2$NH—(CH$_2$)$_3$Si(—OCH$_3$)$_3$

4. 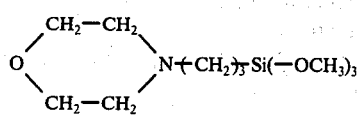

5. C$_6$H$_5$—NH—(CH$_2$)$_3$Si(—OCH$_3$)$_3$

6. 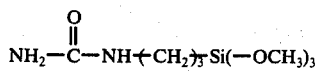

7. NC—(CH$_2$)$_2$Si(—OC$_2$H$_5$)$_3$

8. 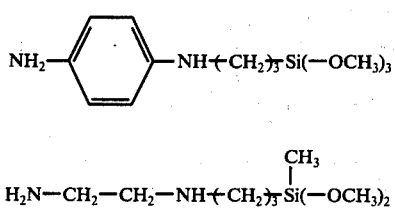

9. H$_2$N—CH$_2$—CH$_2$—NH—(CH$_2$)$_3$Si(—OCH$_3$)$_2$ with CH$_3$ substituent

10. H$_2$N—(CH$_2$)$_3$Si(—OC$_2$H$_5$)$_3$
11. HS—(CH$_2$)$_3$Si(—OCH$_3$)$_3$
12. NH$_2$—(CH$_2$)$_3$Si(—OCOCH$_3$)$_3$

13. 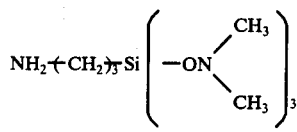

14. 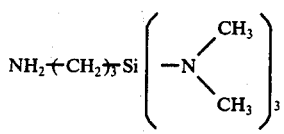

15. 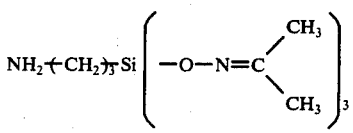

16. NH$_2$—(CH$_2$)$_3$Si(—NHCOCH$_3$)$_3$

The amount of the organic silicon compound as component (e) used in the composition in accordance with the present invention should be in the range of from 0.5 to 10 parts by weight, preferably from 2 to 5 parts by weight, per 100 parts by weight of component (a). If it is less than 0.5 part by weight, sufficiently uniform mixing of components (a), (b) and (c) is difficult to obtain, while if it is more than 10 parts by weight, the crosslinking of the resulting commposition will be remarkably retarded and, at the same time, the component works adversely, that is, it operates as a sort of diluent or plasticizer.

The organic peroxides useful as component (f) in accordance with the invention are used as curing agents for the compositions. The organic peroxide curing agents may be known ones and included among them are, for example, benzoylperoxide, di-tert-butylperoxide, tert-butylperbenzoate, 2,4-dichloroperbenzoate, dicumylperoxide and monochlorobenzoylperoxide. The amount of the organic peroxide used as a curling agent should range from 0.1 to 10 parts by weight per 100 parts by weight of component (a).

The silicone rubber compositions in accordance with the present invention can be prepared, for example, by uniformly mixing the above-described components (a) to (f) in the specified amounts by a suitable mixing machine, such as, a roll or kneader. The order of mixing of the individual components is not limitative, but it is a usual practice that components (a) to (e) are first blended, followed optionally by heat-treatment at a temperature of from 70° to 150° C, and then component (f) is added to form a uniform composition.

In addition to components (a) to (f), various other additives may be used to form the compositions in accordance with the invention. Such additives include dispersing agents, such as, diphenylsilanediol, monophenylsilanetriol, phenylmethylsilanediol, alkoxysilanes and low molecular weight silicone fluids with their chain ends terminated by hydroxy groups; pigments, such as, red iron oxide; and heat-resistance improving agents, such as, ceric oxide.

The silicone rubber compositions thus prepared in accordance with the invention can be converted to cured forms by a conventional curing schedule. The curing schedule may depend upon various factors, such as, the composition of the rubber stock and the dimensions of the articles to be obtained. However, it includes the sequence of, for example, press-curing at a temperature of from 120° to 180° C under a pressure of from 50 to 150° kg/cm$^2$ over a period of from about 10 to about 20 minutes and then post-curing in an air oven at 140° to 200° C for 4 hours or more.

The cured products have superior mechanical properties, especially high tear strength along with high modulus, the other properties being equally good as in conventional silicone rubber elastomers, and are therefore suitable for making belts, hoses, packings, rolls, molds for replica, gaskets and the like.

The following examples are given to further illustrate the present invention and not to limit the invention. All parts are by weight.

EXAMPLE 1

Mixtures were prepared by uniformly kneading the following by a two-roll mill. (a) 100 parts of a hydroxy-endblocked diorganopolysiloxane gum having a polymerization degree of 8,000, composed of 0.25 mole % (CH$_3$)(CH$_2$=CH)SiO units and 99.75 mole % (CH$_3$)$_2$SiO units, (b) 67 parts of Aerosil R-972 (trademark by DEGUSSA, West Germany for finely divided silica), (c) varied amounts as indicated in Table I or an organopolysiloxane resin composed of 55 mole % C$_6$H$_5$SiO$_{1.5}$ units, 20 mole % (CH$_3$)(CH$_2$=CH)SiO units and 25 mole % (CH$_3$)$_2$SiO units, (d) 40 parts of polyester fibers having a softening point of 240° C, a fineness of 3 denier and a length of 1 mm, (e) 1.7 parts of a silane represented by the molecular formula

and, in addition, 5 parts of red iron oxide. Each mixture thus prepared was allowed to stand at room temperature for 7 days, and thereafter 0.8 part of di-tert-butylperbenzoate was added, followed by uniform kneading on a two-roll mill. The resulting compositions were press-cured for 10 minutes at 170° C under a 100 kg/cm² pressure, to obtain sheets 2 mm thick. The sheets were then heated at 150° C for 4 hours in an air oven to obtain elastomers having the properties as set out in Table I.

Table I

| Experiment No. | 1 | 2* | 3* |
|---|---|---|---|
| Amount of component (c), parts | 4 | 0 | 25 |
| Hardness** | 83 | 76 | 78 |
| Elongation at break, %** | 55 | 64 | 100 |
| Tensile strength, kg/cm²** | 135 | 93 | 90 |
| Tear strength, kg/cm** | 86 | 66 | 60 |
| Resilience, %** | 54 | 56 | 48 |

*Controls.
**In accordance with JIS (Japanese Industrial Standard) K 6301.

EXAMPLE 2

Mixtures were prepared by uniformly kneading the following by a two-roll mill. (a) 100 parts of diorganopolysiloxane gum having a polymerization degree of 10,000, composed of 0.15 mole % $(CH_3)(CH_2=CH)SiO$ units, 0.02 mole % $(CH_3)_2(CH_2=CH)SiO_{0.5}$ units and 99.83 mole % $(CH_3)_2SiO$ units, (b) 54 parts of Aerosil 200 (trademark by DEGUSSA), (c) 4.6 parts of the same organopolysiloxane resin as used in Example 1, (d) 30.9 parts of polyester fibers with varied lengths as indicated in Table II, all having the same softening point of 240° C and fineness of 3 denier, and (e) 1.1 parts of a silane expressed by the molecular formula $H_2N-CH_2-CH_2-CH_2-Si(-OC_2H_5)_3$. Each mixture thus prepared was heated at 100° C for 1 hour, and thereafter allowed to cool to room temperature. Thereupon, 1 part of dicumylperoxide was added, followed by uniform kneading on a two-roll mill. The resulting compositions were press-cured to form sheets 2 mm thick in the same manner as in Example 1. The sheets were then heated at 150° C for 4 hours in an air oven to obtain cured elastomers having the properties as set out in Table II.

Table II

| Experiment No. | 4* | 5 | 6 | 7 | 8 | 9* |
|---|---|---|---|---|---|---|
| Length of polyester fibers, mm | 0.3 | 0.7 | 1.0 | 3.0 | 5.0 | 7.0 |
| Hardness** | 86 | 90 | 92 | 92 | 92 | 93 |
| Elongation at break, %** | 104 | 70 | 60 | 52 | 45 | — |
| Tensile strength, kg/cm²** | 90 | 115 | 120 | 158 | 179 | — |
| Tear strength, kg/cm** | 35 | 70 | 83 | 110 | 126 | — |

*Control
**In accordance with JIS K 6301.
Remark: The composition employed in Experiment No. 9 was not sufficiently flowable for the press-cure under a 100 kg/cm² pressure. Besides, in the composition the polyester fibers were hardly dispersed, so that the roll mill blending was found practically impossible.

EXAMPLE 3

Mixtures were prepared by kneading 100 parts of a hydroxy-endblocked diorganopolysiloxane gum having a polymerization degree of 8,000, composed of 0.3 mole % $(CH_3)(CH_2=CH)SiO$ units and 99.7 mole % $(CH_3)_2SiO$ units, 2 parts of diphenylsilanediol and 55 parts of Aerosil R-972 (trademark by DEGUSSA), and the mixtures were heated at 150° C for 1 hour. To each of the mixtures were added 36 parts of polyester fibers having a softening point of 244° C, a fineness of 2 denier and a length of 3 mm, 3.5 parts of an organopolysiloxane resin composed of 30 mole % $C_6H_5SiO_{1.5}$ units, 15 mole % $CH_2CHSiO_{1.5}$ units, 15 mole % $(CH_3)(CH_2=CH)SiO$ units and 40 mole % $(CH_3)_2SiO$ units, 1.6 parts of one of different kinds of the silanes as indicated in Table III and 1.6 parts of ceric oxide, and the resulting mixtures were heated at 80° C for 2 hours, and then allowed to cool to room temperature. Thereupon, using a two-roll mill, 0.7 part of 2,5-dimethyl-2,5-di-tert-butylperoxyhexane was added, followed by press-cure at 170° C under a 150 kg/cm² pressure for 10 minutes to obtain sheets 2 mm thick. The sheets were then heated at 180° C for 5 hours in an air oven to obtain cured elastomers having the properties as set out in Table III. The thus obtained elastomers were then further subjected to an aging test at 150° C for 7 days, and the resulting elastomers had the properties as shown in the same table.

For control, a similar procedure was repeated except only that the use of the silane was omitted, and the results are given in Table III.

Table III

| Experiment No. | 10 | 11 | 12 | 13 | 14* |
|---|---|---|---|---|---|
| Kind of the silane used | A** | B** | C** | D** | None |
| After postcure at 180° C for 5 hours | | | | | |
| Hardness*** | 92 | 94 | 90 | 90 | 85 |
| Elongation at break, %*** | 45 | 40 | 40 | 45 | 65 |
| Tensile strength, kg/cm²*** | 188 | 153 | 167 | 95 | 170 |
| Tear strength, kg/cm*** | 113 | 108 | 93 | 95 | 60 |
| After aging at 150° C for 7 days | | | | | |
| Hardness*** | 93 | 95 | 92 | 92 | 89 |
| Elongation at break, %*** | 38 | 33 | 36 | 35 | 45 |
| Tensile strength, kg/cm²*** | 154 | 137 | 140 | 90 | 143 |
| Tear strength, kg/cm*** | 97 | 95 | 85 | 88 | 56 |

*Control.
**A is for $NH_2-CH_2-CH_2NH(CH_2)_3Si(-OCH_3)_2$ with a $CH_3$ group.
**B is for $NH_2(CH_2)_3Si(-OC_2H_5)_3$.
**C is for $NH_2-\overset{O}{\underset{\|}{C}}-NH(CH_2)_3Si(-OCH_3)_3$.
**D is for $HS-CH_2-CH_2-CH_2-Si(-OCH_3)_3$.
***In accordance with JIS K 6301.

EXAMPLE 4

A mixture was prepared by uniformly blending 100 parts of a hydroxy-end blocked diorganopolysiloxane gum having a polymerization degree of 7,000, composed of 5.0 mole % $(C_6H_5)_2SiO$ units and 95.0 mole % $(CH_3)_2SiO$ units, 1 part of diphenylsilanediol and 45 parts of Aerosil R-972, followed by heating at 50° C for 2 hours. To 146 parts of the resulting mixture were added 25 parts of polyester fibers having a softening point of 244° C, a fineness of 3 denier and a length of 1 mm, 2 parts of the same organopolysiloxane resin as used in Example 3, 0.75 part of the same silane D as used in Example 3 and 0.75 part of vinyl tris(2-methoxyethoxy)silane, and the mixture was kept standing for 24 hours, and then kneaded on a kneader at 120° C for 2 hours. A control was also compounded in which the polyester fiber was omitted entirely from the formulation. To 100 parts of each compound thus obtained were added 2 parts of red iron oxide and 2.5 parts of a paste containing 50% by weight of 2,4-dichlorobenzoylperoxide in a siloxane fluid, and the resulting compositions were molded and press-cured into the form of sheets 1 mm thick by the same manner as in Example 1, and thereafter subjected to post-cure at 180° C for 24 hours. The products were tested for tensile strength at room temperature and also at elevated temperatures with the results as shown in Tabe IV.

Table IV

| Temperature at which the test was conducted | The present invention | Control |
|---|---|---|
| Room temperature | 133 kg/cm² | 95 kg/cm² |
| 100° C | 107 " | 75 " |
| 150° C | 95 " | 55 " |
| 200° C | 90 " | 40 " |

It can be observed from this table that the cured rubber elastomers produced in accordance with the present invention are much improved in their tensile strength at varying high temperatures, compared to the polyester fiber-free silicone elastomers.

Further, the same compositions of the present invention and the control were molded into the form of cubes 10 × 10 × 10 mm and tested for compressive stress at varying compressions. The results are show in the following Table V.

Table V

| Compression | The present invention | Control |
|---|---|---|
| 10 % | 20 kg/cm² | 7 kg/cm² |
| 20 % | 68 " | 18 " |
| 30 % | 108 " | 30 " |
| 40 % | 155 " | 45 " |
| 50 % | 214 " | 70 " |

The above data may be understood that the silicone rubber elastomers of higher compressive stress produced in accordance with the present invention are advantageous since they can be used in a wider range of applications, as compared to the fiber-free products.

What is claimed is:

1. A silicone rubber composition consisting essentially of
   a. 100 parts by weight of a diorganopolysiloxane gum represented by the average unit formula $R_a^1 SiO_{4-a/2}$ where $R^1$ is a substituted or unsubstituted monovalent hydrocarbon group and a has a value from 1.98 inclusive to 2.05 inclusive,
   b. from 20 to 250 parts by weight of an inorganic filler,
   c. from 1 to 20 parts by weight of an organopolysiloxane composed of from 20 to 60 mole % $C_6H_5SiO_{1.5}$ units, from zero to 20 mole % $CH_2=CHSiO_{1.5}$ units, from 15 to 30 mole % $(CH_3)(CH_2=CH)SiO$ units and 20 to 50 mole % $(CH_3)_2SiO$ units, the total of the $C_6H_5SiO_{1.5}$ and $CH_2=CHSiO_{1.5}$ units being equivalent to from 20 to 60 mole % based on all siloxane units,
   d. from 10 to 100 parts by weight of polyester fiber having a softening point of 200° C or higher, and composed of filaments from 0.5 to 5 mm in length,
   e. from 0.5 to 10 parts by weight of an organic silicon compound represented by the formula

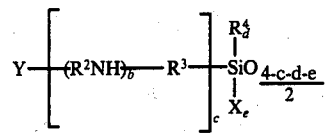

where $R^2$ and $R^3$ each are the same or different divalent hydrocarbon groups, $R^4$ is a substituted or unsubstituted monovalent hydrocarbon group, X is a hydroxy or hydrolyzable group, Y is a group selected from the class consisting of $H_2N-$, $NC-$, $HO.CO.CH_2.NH-$, $NH_2.CO.NH-$,

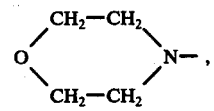

$C_6H_5-NH-$ and $HS-$, b has a value of 0 or 1, c has a value greater than 0 but not exceeding 1, and d and e each have a value from 0 inclusive to 3 inclusive, with the proviso that $(c+d+e)$ is equal to a value greater than 0 but not exceeding 4, and
   f. from 0.1 to 10 parts by weight of an organic peroxide.

2. The silicone rubber composition as claimed in claim 1 wherein said component (a) is dimethylpolysiloxane gum having no more than 0.5 mole % methylvinylsiloxane units, the rest of siloxane units being dimethylsiloxane units.

3. The silicone rubber composition as claimed in claim 1 wherein said component (a) is a diorganopolysiloxane gum having no more than 10 mole % of phenyl groups directly bonded to silicon atoms, based on all organic groups, the rest of the organic groups being methyl and vinyl groups.

4. The silicone rubber composition as claimed in claim 1 wherein said component (b) is a finely divided silica.

5. The silicone rubber composition as claimed in claim 1 wherein said component (c) is an organopolysiloxane containing 0.5% by weight or more of hydroxy groups directly bonded to silicon atoms.

6. The silicone rubber composition as claimed in claim 1 wherein the group denoted by X is a methoxy or ethoxy group.

7. The silicone rubber composition as claimed in claim 1 wherein said component (e) is one selected from the group consisting of the silanes expressed by the formulas 1. $H_2N-CH_2-CH_2-NH-(CH_2)_3Si(-OCH_3)_3,$ (2)

$H_2N-CH_2-CH_2-NH(CH_2)_3Si(-OCH_3)_2,$
$\quad\quad\quad\quad\quad\quad\quad\quad\quad\quad\quad\quad |$
$\quad\quad\quad\quad\quad\quad\quad\quad\quad\quad\quad\quad CH_3$ 3. $H_2N-CH_2-CH_2-Si(-OC_2H_5)_3,$
4. $H_2N-CH_2-CH_2-CH_2-Si(-OC_2H_5)_3,$ (5)

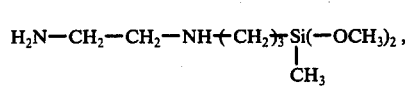

6. $HS-CH_2-CH_2-CH_2-Si(-OCH_3)_3$ and
7. $C_6H_5-NH-(CH_2)_3Si(-OCH_3)_3$.

8. The silicone rubber composition as claimed in claim 1 wherein said component (c) is present in an amount from 1 to 5 parts by weight per 100 parts by weight of said component (a).

9. The silicone rubber composition as claimed in claim 1 wherein said component (d) is present in an amount from 10 to 60 parts by weight per 100 parts by weight of said component (a).

10. The silicone rubber composition as claimed in claim 1 wherein said component (e) is present in an amount from 2 to 5 parts by weight per 100 parts by weight of said component (a).

11. A silicone rubber composition consisting essentially of
    a. 100 parts by weight of diorganopolysiloxane gum represented by the average unit formula $$R_a^1SiO_{(4-a/2)}$$

where $R^1$ is a substituted or unsubstituted monovalent hydrocarbon group and a has a value from 1.98 to 2.05 inclusive, not exceeding 0.5 mole % of the siloxane units being methylvinylsiloxane units, not exceeding 10 mole % of the groups denoted by $R^1$ being phenyl groups directly bonded to silicon atoms and the rest of the organic groups being methyl groups,
    b. from 10 to 100 parts by weight of finely divided silica,
    c. from 1 to 5 parts by weight of an organopolysiloxane composed of from 20 to 60 mole % $C_6H_5SiO_{1.5}$ units, from zero to 20 mole % $CH_2=CHSiO_{1.5}$ units, from 15 to 30 mole % $(CH_3)(CH_2=CH)SiO$ units and 20 to 50 mole % $(CH_3)_2SiO$ units, the total of the $C_6H_5SiO_{1.5}$ and $CH_2=CHSiO_{1.5}$ units being equivalent to from 20 to 60 mole % based on all siloxane units,
    d. from 10 to 60 parts by weight of polyester fiber having a softening point of 200° C or higher and composed of filaments from 0.5 to 5 mm in length,
    e. from 2 to 5 parts by weight of an organic silicon compound selected from the group consisting of the silanes expressed by the formulas
    1. $H_2N-CH_2-CH_2-NH-(CH_2)_3Si(-OCH_3)_3$, $$H_2N-CH_2-CH_2-NH+CH_2)_3Si(-OCH_3)_2, \atop CH_3 \qquad (2)$$

3. $H_2N-CH_2-CH_2-Si(-OC_2H_5)_3$,
    4. $H_2N-CH_2-CH_2-CH_2-Si(-OC_2H_5)_3$, $$NH_2-\overset{O}{\overset{\|}{C}}-NH+CH_2)_3Si(-OCH_3)_3, \qquad (5)$$

6. $HS-CH_2-CH_2-CH_2-Si(-OCH_3)_3$ and
    7. $C_6H_5-NH-(CH_2)_3Si(-OCH_3)_3$.
    f. from 0.1 to 10 parts by weight of an organic peroxide.

12. A silicone rubber product prepared by curing the composition as claimed in claim 1.

* * * * *